United States Patent [19]

Lipschutz

[11] 4,179,789

[45] Dec. 25, 1979

[54] PROCESS FOR PRODUCING A PISTON-TYPE SAFETY LOCK DEVICE

[75] Inventor: Paul Lipschutz, Croissy, France

[73] Assignee: Neiman S.A., Courbevoie, France

[21] Appl. No.: 847,955

[22] Filed: Nov. 2, 1977

Related U.S. Application Data

[62] Division of Ser. No. 767,584, Feb. 10, 1977, abandoned.

[30] Foreign Application Priority Data

Mar. 1, 1976 [FR] France ................................ 76 05707

[51] Int. Cl.$^2$ ........................ B23P 15/00; E05B 29/04

[52] U.S. Cl. ........................................ 29/412; 29/416; 29/434; 29/33 Q; 29/33 S; 29/566.1; 83/41; 83/50; 113/116 BB; 70/364 R; 70/377

[58] Field of Search ................. 29/412, 416, 415, 417, 29/434, 445, 33 Q, 33 S, 566.1; 83/39, 40, 41, 50, 55; 113/116 BB, 116 V, 116 Y; 70/364 A, 364 R, 377, 378, DIG. 5, DIG. 40

[56] References Cited

U.S. PATENT DOCUMENTS

| | | | |
|---|---|---|---|
| 818,719 | 4/1906 | Webb | 70/364 R |
| 1,498,035 | 6/1924 | Heyer | 70/364 R |
| 1,516,057 | 11/1924 | Ostmeyer | 70/364 A |
| 1,953,535 | 4/1934 | Hurd | 29/445 |
| 2,283,489 | 5/1942 | Crousore | 70/364 A |
| 2,366,948 | 1/1945 | Winterhalter | 29/415 |

FOREIGN PATENT DOCUMENTS

| | | | |
|---|---|---|---|
| 2113806 | 10/1972 | Fed. Rep. of Germany | 70/364 A |
| 1447206 | 6/1966 | France | 70/364 A |
| 397147 | 8/1933 | United Kingdom | 29/412 |
| 763028 | 12/1956 | United Kingdom | 70/364 A |

*Primary Examiner*—Francis S. Husar
*Assistant Examiner*—Daniel C. Crane
*Attorney, Agent, or Firm*—A. C. Nolte, Jr.; Edward B. Hunter

[57] ABSTRACT

A piston-type safety lock device, of the type comprising a cylindrical rotor journalled in a cavity of a stator. Said rotor contains a plurality of radially slidable pistons cooperating at their inner end with the notches of a key for bringing their other end flush with the periphery of said rotor. Said other end bears against the inner surface of the cavity in which the rotor is journalled and, for one angular position of the rotor, against pistons slidable in the stator and elastically biased toward the rotor. Said pistons of the stator and rotor are flat blanked members. Said pistons are disposed respectively in a single slot of the stator and in a single slot of the rotor and have rectilinear and parallel lateral edges which are in contact with the lateral edge of an adjacent piston or the end of said slot.

2 Claims, 10 Drawing Figures

PROCESS FOR PRODUCING A PISTON-TYPE SAFETY LOCK DEVICE

This is a division of application Ser. No. 767,584 filed Feb. 10, 1977, now abandoned.

The present invention relates to piston-type safety lock devices.

Known piston-type lock devices comprise a fixed part or stator provided with an axial cavity in which a rotary member or rotor is journalled. The rotor contains radial bores aligned along a generatrix and opening onto a longitudinal slot for receiving a key. Disposed in these bores are cylindrical pistons which cooperate with coded notches of the key, each piston having such length that, with the correct key in position, the end of each piston opposed to the key is exactly flush with the outer surface of the rotor.

The stator has a series of radial bores which are aligned in the longitudinal direction and open onto the cavity in which the rotor is journalled. Each of these radial bores contains a cylindrical piston of the same diameter as the pistons of the rotor and a spring which biases the piston toward the rotor.

In one angular position of the rotor, the bores of the rotor are in alignment with the bores of the stator. In the absence of the key, the pistons of the stator, biased by their respective springs, urge the pistons of the rotor toward the centre and partly penetrate the bores of the rotor which is thus locked against rotation. It is only with the correct key that the pistons of the rotor can be brought into a position in which they are flush with the surface of the rotor so as to release the rotor.

These known piston-type lock devices have a complicated construction and are expensive. The pistons are indeed produced by a turning operation and the bores in the stator and rotor are machined or calibrated. In automatic assembling machines, the pistons are distributed by means of numerous vibrating bowls or stored after degreasing in tubes of plastics material. The moulds for producing the stators and rotors are fragile and require considerable maintenance. Owing to their complication, these parts themselves are delicate to produce and present many problems of burring. Moreover, the errors of combination between keys and the lock device are frequent, since the keys are notched independently of the production of the lock device.

Further, in order to obtain a constant load on the pistons of the rotor, which prevents detecting the combination by feel, couples of pistons are often employed, the total length of which is constant, and this multiplies the number of different pistons. Note also that the tolerances required for the movements of the pistons in their bores and for the release of the rotor adversely affect the precision of the lock device.

An object of the present invention is to overcome the drawbacks of known piston-type lock devices by means of a new lock device the production of which is simplified and capable of being rendered automatic in synchronism with the notching of the keys, the new lock device being cheaper and more precise than the known piston-type lock devices.

According to the invention, there is provided a piston-type safety lock device of the type comprising a cylindrical rotor journalled in a cavity of a stator, said rotor containing a plurality of radially slidable pistons which cooperate at their inner end with the notches of a key so as to bring their other end flush with the periphery of said rotor, said other end bearing against the inner surface of the cavity in which the rotor is journalled and, for one angular position of the rotor, against pistons which are slidable in the stator and are elastically biased toward the rotor, wherein said pistons of the stator and rotor are flat blanked members, said pistons are disposed respectively in a single slot of the stator and in a single slot of the rotor and have rectilinear and parallel lateral edges in contact with the lateral edge of an adjacent piston or the end of said slot.

The use of flat blanked pistons permits a simplification of the production of the pistons and the obtainment, in the course of the notching of the key of the lengths corresponding to the desired combination. The mounting of the pistons with their edges adjoining in a single slot of the rotor or stator permits a considerable simplification of these cast parts and their production.

Another object of the invention is to provide a process and device for producing the aforementioned lock device.

The invention will be understood from the ensuing description with reference to the accompanying drawings, in which.

Figure 1:
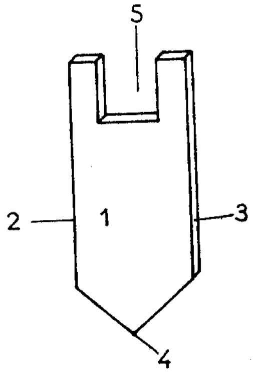
FIG. 1 is a perspective view of a flat member employed for forming a couple of pistons.

FIG. 1 shows a flat blanked member or blank 1 having two parallel lateral edges 2 and 3, a pointed end 4 and a notch 5 in its upper part.

Figure 2:
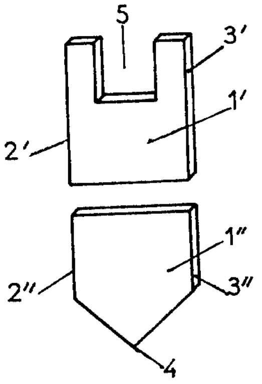
FIGS. 2 and 3 are respectively perspective views of two couples of pistons obtained from the member shown in FIG. 1.
Figure 3:
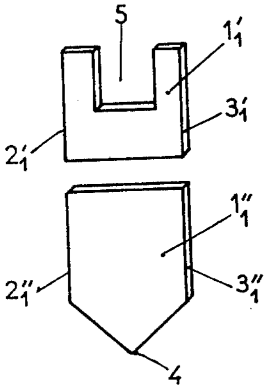

By shearing along a line perpendicular to the edges 2 and 3, the blank 1 is divided into two pistons 1' and 1'' (FIG. 2) or $1'_1$ and $1''_1$ (FIG. 3), the sum of the lengths of which is constant and which correspond to two different depths of notches of the key.

Figure 5:
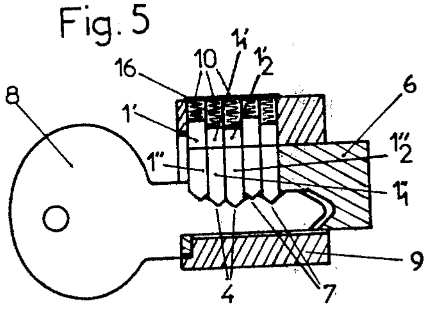
FIG. 5 is a longitudinal sectional view of a lock device according to one embodiment of the invention.
Figure 6:
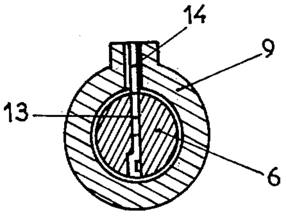
FIG. 6 is a diametral sectional view of the lock device shown in FIG. 5, the key, the pistons and the springs having been omitted.

The pistons 1'' and $1''_1$ are adapted to be disposed in the rotor 6 of the lock device (FIG. 5), the points 4 cooperating with the notches 7 of the key 8. The pistons 1' and $1''_1$ are adapted to be disposed in the stator 9 of the lock device and the notches 5 receive coil springs 10.

Figure 4:
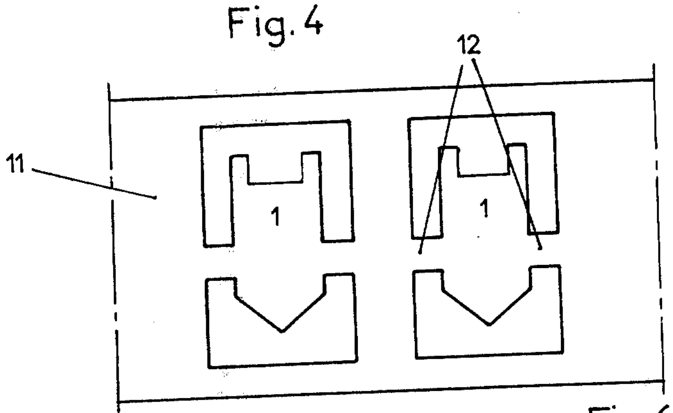
FIG. 4 is a plan view of a portion of a preblanked strip for producing members according to FIG. 1.

Instead of being produced in advance and stored, the blanks 1 may be pre-blanked in a metal strip 11 (FIG. 4) which may be stored on a reel and fed directly to a lock device producing machine. The blanks 1 are connected to the strip 11 by strip portions 12 which are sheared at the same time as each member 1 is blanked into two pistons.

Figure 8:
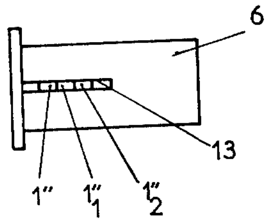
FIG. 8 is a plan view of the rotor of the lock device shown in FIGS. 5 and 6.

For receiving of pistons 1'', $1''_1$ and $1''_2$, etc., the rotor 6 has a longitudinal slot 13 (FIG. 8) in which the pistons are disposed side-by-side, the lateral edges 3 of each piston being guided by a lateral edge of a neighbouring piston or, in respect of the end pistons, by an end of the slot 13.

Figure 7:
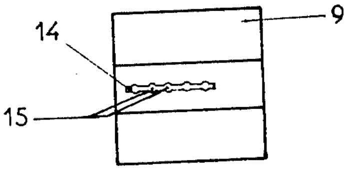
FIG. 7 is a top plan view of the stator of the lock device shown in FIGS. 5 and 6, some of the parts of which have been omitted to render the drawing more clear.

Likewise, the stator 9 has a longitudinal slot 14 (FIG. 7) in which the pistons 1', 1'$_1$, 1'$_2$, etc. are disposed in the same manner as before. Cavities 15 are formed in a part of the height of the slot 14 for receiving the springs 10. The cavities 15 open onto the exterior of the stator 9 and are closed by a common cover 16 (FIG. 5) which retains the springs 10.

It can be seen that the production of the rotor and stator, which are cast parts, is greatly simplified when the independent bores containing the pistons are replaced by a single slot.

Figure 9:
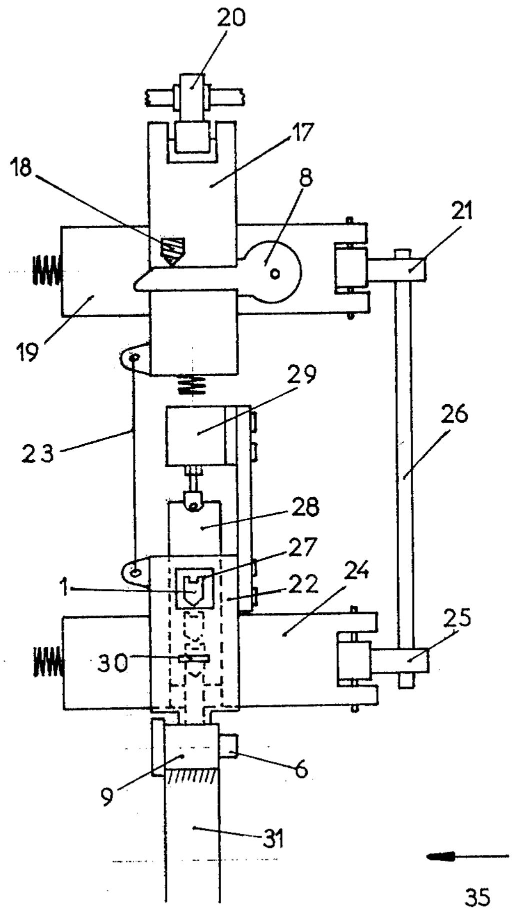
FIG. 9 is a diagrammatic plan view of a machine for producing lock devices according to FIGS. 5 and 6.
Figure 10:
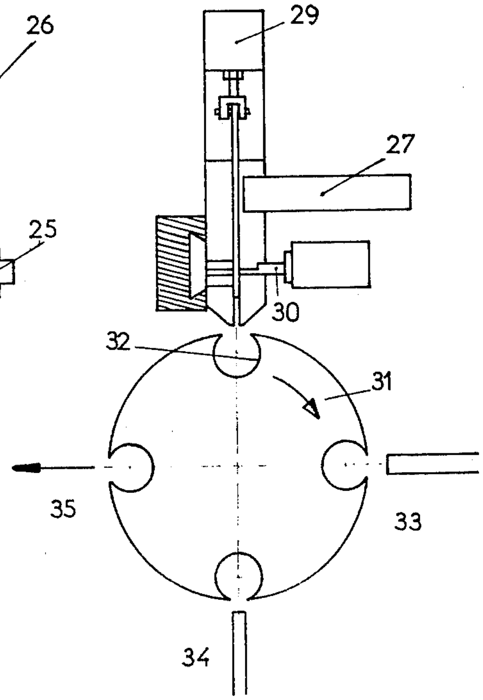
FIG. 10 is an elevational view of a part of the machine shown in FIG. 9.

The lock device just described lends itself particularly well to a production carried out at the same time as the notching of the corresponding key or keys so that any subsequent risk of error is avoided. One embodiment of such a machine for assembling the lock device and simultaneously notching keys is shown diagrammatically in FIGS. 9 and 10.

The machine comprises two main elements, namely a key notching element and a lock device assembling element. These two elements are interdependent and their movements are synchronized.

The key notching element, known per se, comprises a transverse carriage 17 carrying a punch 18 for the blanking of the depth of the notches on the key 8, and an axial carriage 19 which determines the spacing of the notches. The movement of the carriage 17 is controlled by a cam 20 and the movement of the carriage 19 by a cam 21.

The element for assembling the lock device comprises a transverse carriage 22 connected to the carriage 17 by a rod 23 and an axial carriage 24 actuated by a cam 25 keyed on a shaft 26 on which the cam 21 shifting the carriage 19 is also keyed. Consequently, the carriage 22 is subjected to movements which are identical to those of the carriage 17 and the carriage 24 undergoes movements which are identical to, or synchronized with, those of the carriage 19.

The carriage 22 carries a magazine 27 (FIG. 10) which feeds flat blanked blanks 1 (or pre-blanked strips 11) which are fed one-by-one by a pusher blade 28 shifted by a jack 29 or any other suitable device. The blanks 1 fed by the blade 28 are blanked into stator and rotor pistons by a punch 30, the synchronization of the movements of the carriages 17 and 22 automatically ensuring the identity of combination of the notch cut into the key 8 by the punch 18 and the pistons blanked in the member 1 by the punch 30.

The separated pistons are introduced into the stator 9 and rotor 6 of the lock device which is carried by a rotary drum 31 provided with receiving cavities 32. After introduction of the suitable number of pairs of pistons, the drum 31 brings the lock device to a station 33 where the springs 10 are placed in position. A further rotation of the drum 31 brings the lock device to a station 34 where the spring retaining cover 16 is mounted and, after a further rotation of the drum 31, the finished lock device is discharged at a station 35.

What is claimed is:

1. A process for producing a piston-type safety lock device of the type comprising a cylindrical rotor journalled in a cavity of a stator, said rotor containing a plurality of radially slidable pistons cooperating at their inner ends with the notches of a key for bringing their other ends flush with the periphery of said rotor, said other ends bearing against the inner surface of the cavity in which the rotor is journalled and, for one angular position of the rotor, against pistons slidable in the stator and elastically biased toward the rotor, the sum of the length of the piston in said rotor and that of a piston slidable in said stator with which said piston of said rotor cooperates in said one angular position, being a constant, and said two pistons constituting a matched pair of pistons wherein each said pair of pistons of the stator and rotor are formed from a single flat blanked member, and said pistons are disposed respectively in a single slot of the stator and in a single slot of the rotor and have rectilinear and parallel lateral edges which are in contact with the lateral edges of an adjacent piston or with the end of said slot, said process comprising feeding a single flat blanked member relative to a device for blanking a flat blanked member by a displacement related to the depth of the notches to be made in the key, notching said key, blanking said single flat blanked member to form a pair of pistons the lengths of which are in direct relation to the depth of the corresponding notch of the key and the sums of the lengths of which are equal to said constant, feeding said pistons into a stator and a rotor of a lock device, each of which is provided with a receiving slot, repeating the operation as many times as the key has notches, placing return springs for said pistons in position and mounting retaining means for said pistons.

2. A process as claimed in claim 1 wherein said notches of said key are formed simultaneously with the blanking of said blanks, said key being mounted upon a notching carriage, effecting movement of said notching carriage relative to notch forming means both longitudinally and transversely to cut longitudinally spaced notches of varying depths; mounting a blank in a blanking carriage, causing said blanking carriage to be moved in synchonism with said notching carriage relative to blanking means to cause a blank to be formed into two pistons of lengths related to the depth of a notch of said key with which said pistons are to be associated.

* * * * *